United States Patent [19]

Cook

[11] 4,238,968

[45] Dec. 16, 1980

[54] DEVICE FOR CONVERSION OF CENTRIFUGAL FORCE TO LINEAR FORCE AND MOTION

[76] Inventor: Robert L. Cook, 605 Wilson Ave., Vallejo, Calif. 94590

[21] Appl. No.: 945,245

[22] Filed: Sep. 25, 1978

[51] Int. Cl.³ .............................................. F16H 33/20
[52] U.S. Cl. ..................................... 74/84 R; 74/84 S
[58] Field of Search ............................. 74/84 R, 84 S

[56] References Cited

U.S. PATENT DOCUMENTS

| 1,953,964 | 4/1934 | Laskowitz | 74/84 R |
|---|---|---|---|
| 2,009,780 | 7/1935 | Laskowitz | 74/84 R |
| 2,306,723 | 12/1942 | Floraday | 268/124 |
| 2,350,248 | 5/1944 | Nowlin | 74/61 |
| 3,555,915 | 1/1971 | Young, Jr. | 74/84 S |
| 3,683,707 | 8/1972 | Cook | 74/84 S |
| 3,968,700 | 7/1976 | Cuff | 74/84 S |

*Primary Examiner*—Allan D. Herrmann
*Attorney, Agent, or Firm*—Bielen and Peterson

[57] ABSTRACT

A device to employ centrifugal force for use as linear motion utilizing a pair of counter rotating arms about a common axle. One arm contains a mass splitable and transferable to the other arm and back again at one hundred and eighty degree intervals. The device may include a surface travel system or two of such devices may be employed in tandem for any mode of travel.

11 Claims, 12 Drawing Figures

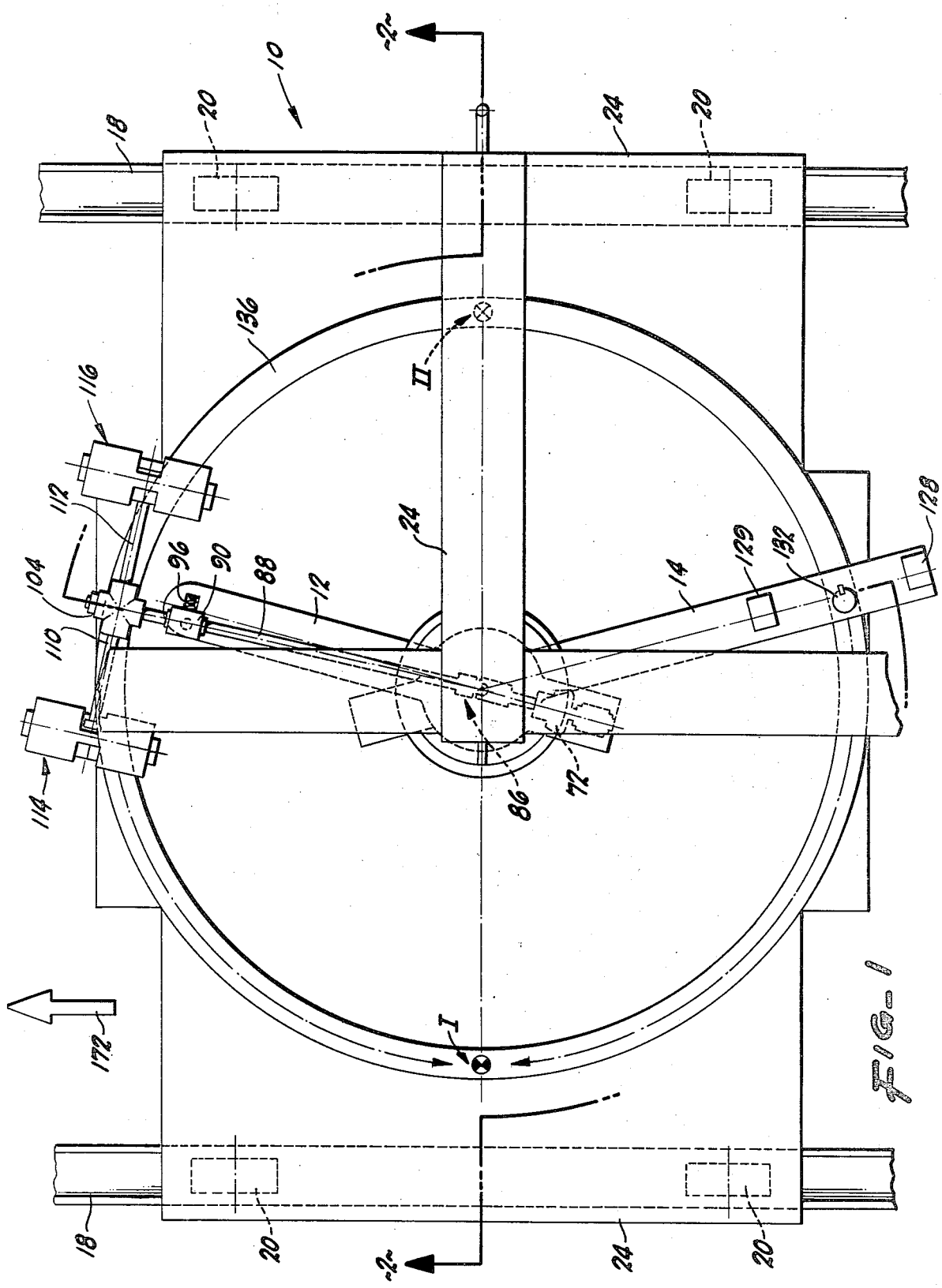

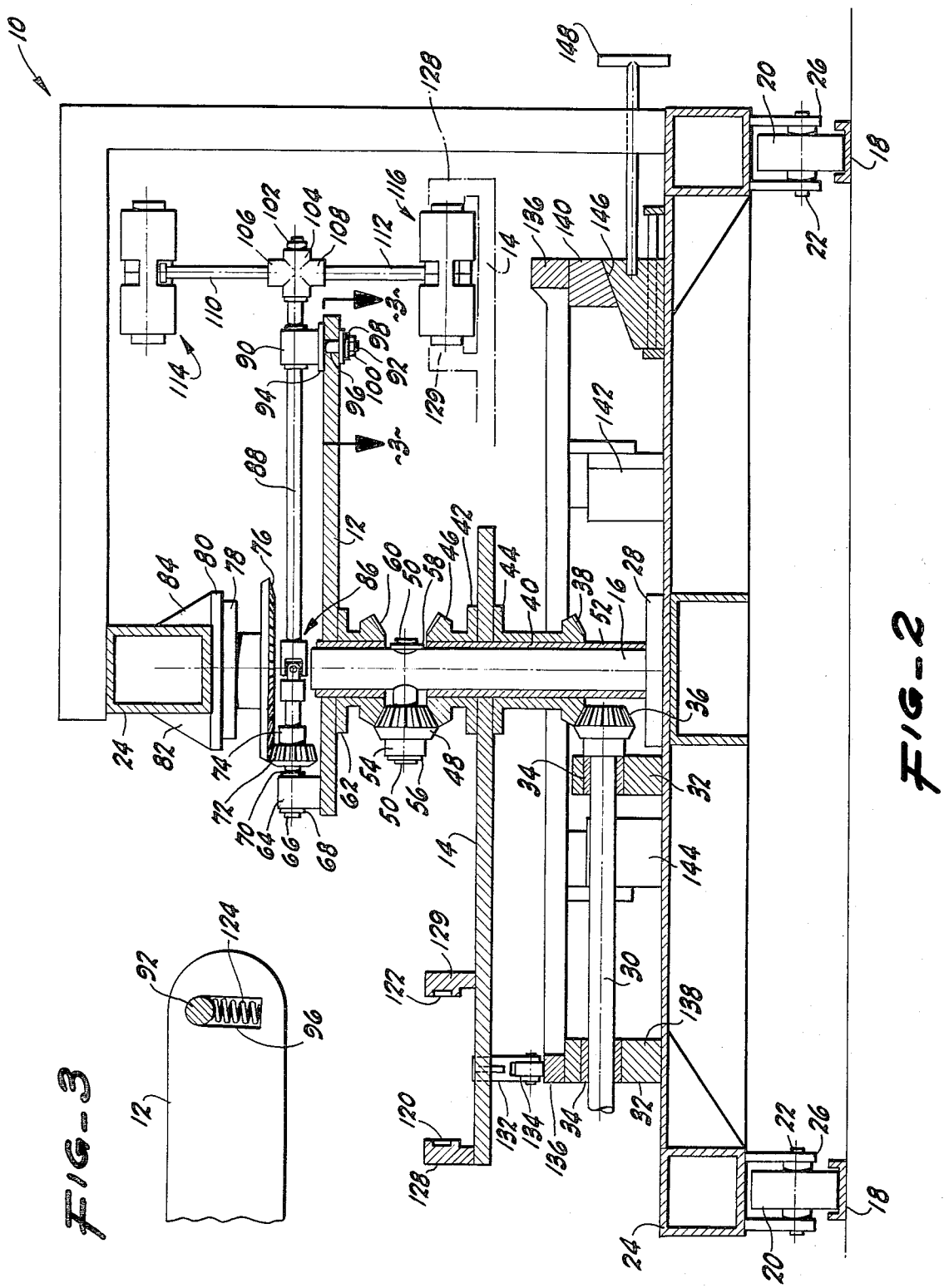

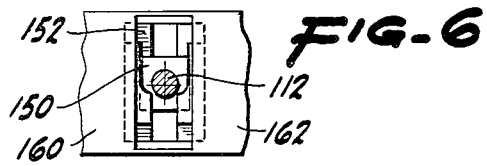
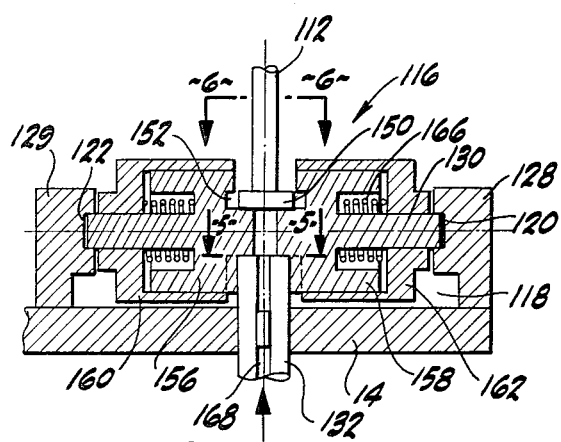
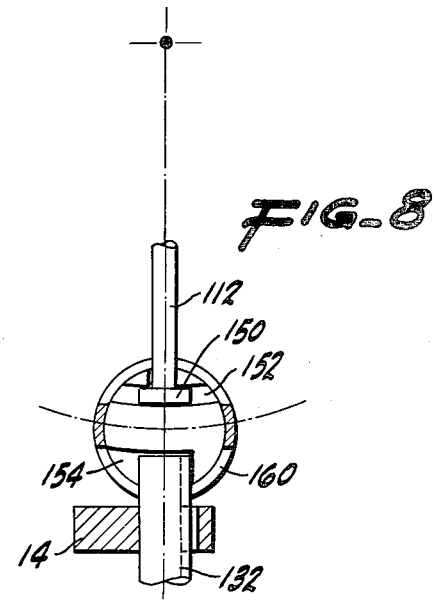
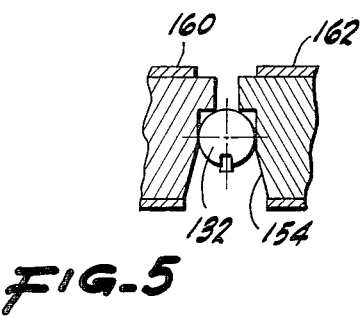
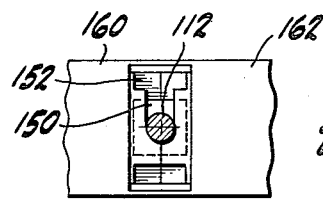
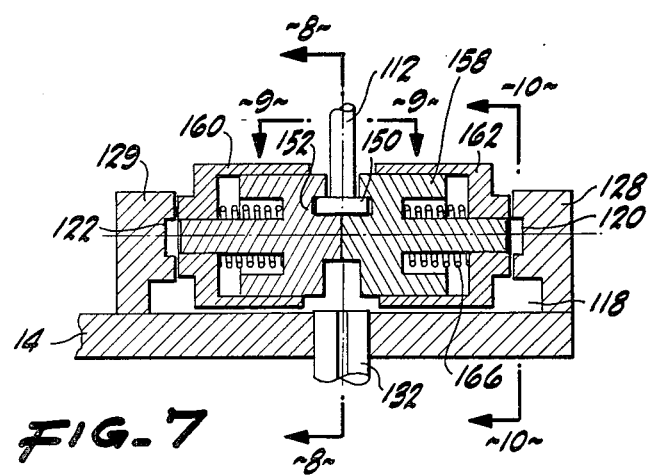
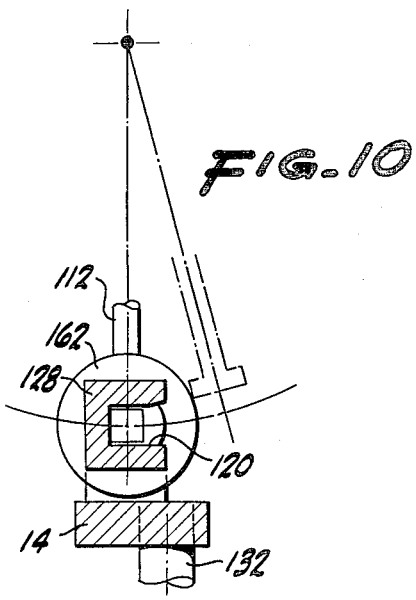

DEVICE FOR CONVERSION OF CENTRIFUGAL FORCE TO LINEAR FORCE AND MOTION

BACKGROUND OF THE INVENTION

The present invention relates to a device for the conversion of centrifugal force to linear force and, therefore, linear motion. The device may be used to propel any common vehicle such as automobiles, rail cars, and marine, aviation and space carriers, and the like.

As enunciated by Sir Issac Newton, an object directed along a curved path will exert a force against the retraining or directing item. In other words, a force is produced by an object that constantly changes direction, since a change in speed or direction constitutes acceleration. As is well known, the centrifugal force is directly proportional to the mass of the object, or the radius of the circle through which the object moves, or the square of the angular velocity of the spinning object. Therefore, doubling the number of revolutions per minute of the object, will increase the centrifugal force by a factor of four (4).

Centrifugal force often expressed in the amount "times" the normal pull of gravity or "g's", may produce a surprisingly large force. For example, an object following a circular path having a radius of ten centimeters, at a rate of six hundred revolutions per minute, generates a centrifugal force which is 41 times gravity.

As can be surmised, a device that enables the transformation of the centrifugal force produced by a rotating body into a linear force, with only a modest efficiency, may be applied to any mode of vehicle travel.

In the past, various attempts have been put forth to reap the advantages of the powerful and easily generated centrifugal force by effecting such a transformation. For example, these apparatuses have rotated mass members and shifted the center of gravity relative to the axis of rotation. The result has been the development of a centrifugal force greater where the mass has shifted, than the remainder of the rotational cycle. In essence, the length of the radius of the arm has been changed. As is well known, the conservation of angular momentum would tend to correspondingly decrease the speed of the mass shifted.

As an example of a successful machine of this type, reference is made to U.S. Pat. No. 3,683,707, issued on Aug. 15, 1972, to applicant. However, machines of this type, although workable, are not efficient enough to produce the desired linear force to warrant general use.

SUMMARY OF THE INVENTION

The present invention provides a device for converting the force of a spinning or rotating mass into a linear component of force usable to propel a vehicle in a linear path.

In accordance with the present invention, a first rotating arm is provided, moving about an axis of rotation. A pair of balanced masses rotates at the terminus of the arm in a plane perpendicular to the plane of the first arm. A second arm counter-rotates about the same axis with respect to the first rotating arm and moves within a plane parallel to the plane of rotation of the first arm. A mechanism cooperative between the first and second arms permits the transfer of one of the balanced weights from the first arm to the second arm. At a selected point in the rotational path of both arms, one of the masses transfers causing cancellation of the centrifugal force produced by the first rotating arm. The mass again transfers from the second arm to the first arm after one hundred eighty degrees of circular travel of both arms. At this point, there is a centrifugal force bias in favor of the arm having the masses which continues for another one hundred eighty degrees of arcuate travel, when compared to the prior semicircle traveled. In other words, the net result of the arm having the pair of masses is an imbalanced centrifugal force during half of the circular path of both arms.

The resultant imbalance may be transmitted into a linear uni-directional component of force by mounting both rotating arms on a rail or frictional wheel carriage.

Usage of two synchronized sets of counterrotating arms to a leg connecting both axes of rotation, necessarily eliminates the deflecting component of the centrifugal force along the axes of the counter rotating arms. In this case, the rail and frictional wheel carriage would not be required since a true linear force has been fashioned.

It is, therefore, an object of the present invention to provide a device that efficiently converts centrifugal force from rotating members into linear force and linear movement.

It is a further object of the present invention to provide a device useable as a source of motivation for any vehiclar means by the employment of rotational motion which is converted into linear motion.

It is yet another object of the present invention to provide an imbalanced centrifugal force in a given semicircle of the rotational cycle of an object and the usage of the linear components of the centrifugal force produced to propel a vehicle.

It is another object of the present invention to combine the effects of a plurality of devices producing a biased centrifugal force to cause linear motion without the necessity of frictional engagement of the vehicle with a surface of travel.

The invention possesses other objects and advantages as concerns particular features and characteristics, thereof, which will become apparent as the specification continues. For a better understanding of the invention, reference is made to the following description.

BRIEF DESCRIPTION OF THE DRAWINGS

FIG. 1 is a plan view of the device with the counter rotating arms shown in phantom at the transfer points.

FIG. 2 is sectional view taken along line 2—2 of FIG. 1.

FIG. 3 is a broken sectional view taken along line 3—3 of FIG. 2.

FIG. 4 is a broken side elevational view of the mass transfer mechanism in the activated position.

FIG. 5 is broken sectional view taken along line 5—5 of FIG. 4.

FIG. 6 is a broken sectional view taken along line 6—6 of FIG. 4.

FIG. 7 is a broken side elevational view of the mass transfer mechanism in the deactivated position.

FIG. 8 is a broken sectional view taken along line 8—8 of FIG. 7.

FIG. 9 is a broken sectional view taken along line 9—9 of FIG. 7.

FIG. 10 is a broken sectional view taken along line 10—10 of FIG. 7.

DESCRIPTION OF THE PREFERRED EMBODIMENTS

Figure 11:
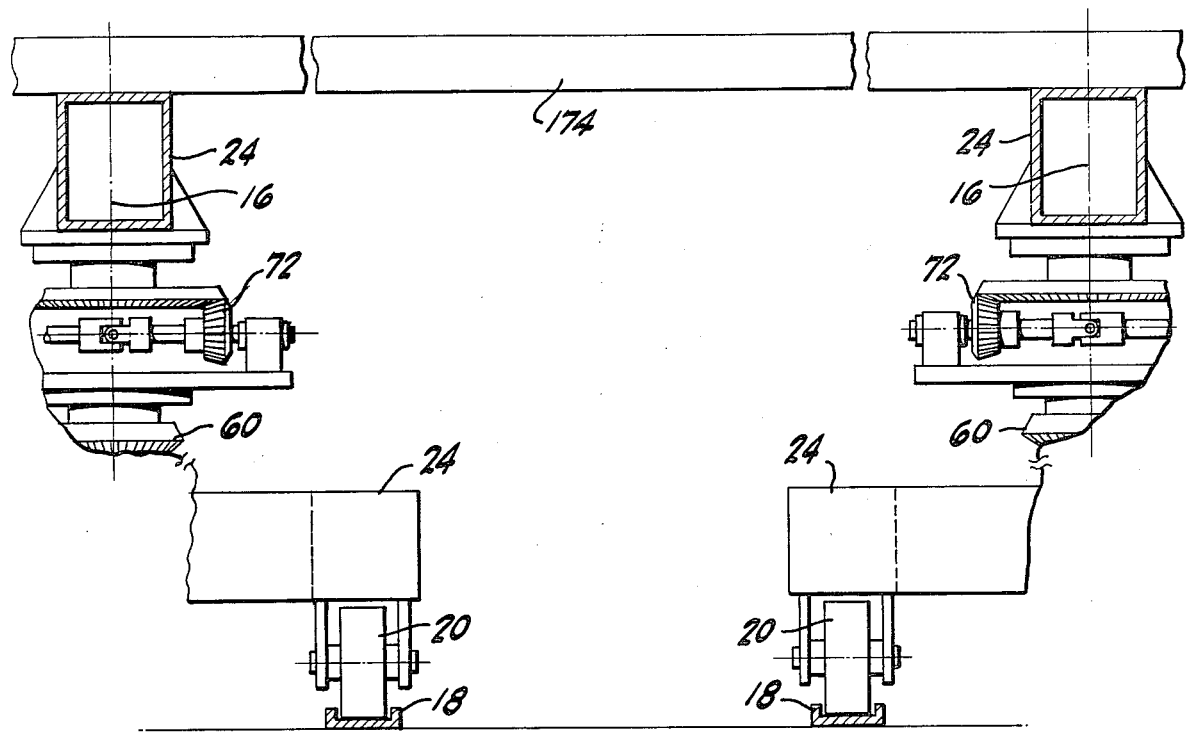
FIG. 11 is a fragmentary sectional view showing a pair of devices in side-by-side connection.

With reference to the drawings, the device or apparatus as a whole is depicted in its entirety by reference character 10. FIG. 1 shows the device 10 which includes a first arm 12 and a second arm 14 which counter rotate with respect to one another about an axle 16, FIGS. 1 and 2. The circular paths of the arms 12 and 14 lie in parallel planes such that the arms are positioned in overlying alignment twice during the rotational cycle of both arms 12 and 14. As shown by FIG. 1, in partial phantom, the alignment of the two arms takes place one hundred and eighty degrees (180°) apart and these positions are denoted as the "transfer points I and II", a fuller explanation of which will be hereinafter provided.

In the present embodiment, the device 10 is contemplated for use on a surface, but the device may be employed for any method of travel including travel in water, air and space media. As shown, the device 10 travels on a rail track 18 by the use of wheels rotating about spindles 22 that support frame 24, via forks 26, which are fixed by attached to frame 24 and spindle 22. The frame 24 secures to axle 16 by the use of flange 28 by any suitable means, such as welding.

With reference to FIG. 2, driving shaft 30 turns by the energy derived from any source of power (not shown). Block portion 32 and bearings 34 support shaft 30 to allow smooth axial turning of the shaft, well known in the art. Shaft 30 includes a miter gear 36, on the end nearest axle 16, which meshingly engages bevel gear 38 integral with bushing 40, which is free to slide about the bearing surface 52 circumferentially affixed to axle 16. Flanges 42 and 44 afix to arm 14 such that the rotation of bushing 40 rotates arm 14 about the axis of axle 16. The upper end of bushing 40 connects to bevel gear 46 which meshingly engages miter gear 48. Stud 50 fixedly engages axle 16 and bearing 54 circumscribes the stud 50. Miter gear 48, thus rotates about the fixed axis of stud 50. C-rings 56 and 58 prevent the movement of stud 50 and miter gear 48.

Bevel gear 60 meshingly engages miter gear 48 and rotates in the direction opposite to bevel gear 46. Flange 62, depicted as integral with bevel gear 60, affixes to arm 12 such that arm 12 rotates opposite to arm 14.

One end of arm 12 includes a bearing mount 64 which circumferentially holds shaft 66. Pin 68 positions shaft 66 within bearing 64 which has a seal 70. Miter gear 72 affixes to shoulder 74 which surroundingly engages shaft 66. Miter gear 72 meshingly engages bevel gear 76 and turns shaft 66. Flanges 78 and 80 join to hold bevel gear in a stationary position with respect to miter gear 72. Stiffeners 82 and 84 strengthen the interconnection of flanges 78 and 80 to the frame 24.

Universal joint 86 affixes shaft 66 to shaft 88 which passes through bearing mount 90. Stub 92 affixes to base plate 94 which secures to bearing mount 90. Stub 92 passes through an arcuate slot 96 in arm 12, best depicted in FIG. 3; the purpose of which will be described in detail as the specification continues. The lower end of stub 92 is capped by washer 98 and nut 100. Stub 92 may travel within the confines of arcuate slot 96 subject to dampening by spring 124.

Shaft 88 engages bearing 102 which fits within hub 104 having wings 106 and 108. Bars 110 and 112 affix to wings 106 and 108 respectively on one end and to masses 114 and 116 on the other end. Masses 114 and 116 are preferably of equal size; mass and weight, therefore, balance one another when shaft 88 rotates bars 110 and 112 (which are of equal length) and the masses 114 and 116. The hub 104 also functions to dampen oscillations upon the transfer of one of the weights, as will be discussed in detail hereinafter. Arm 14 has a U-shaped channel 118 between partitions 128 and 129 corresponding in the width dimension to the width of mass 114 or 116. Opening 120 and 122 receive the fingers (not shown) of mass 114 or the fingers of mass 116 (only exemplar finger 130 shown) dependent upon which mass is transferred from arm 12 to arm 14.

Pin 132 rides on cam follower 134 which travels a flexible circular cam on track 136. Cam track 136 is supported by a plurality of blocks, including blocks 138, 140, 142, and 144. Block 140 includes an inclined surface having a handle structure 144 thereattached, such that the circular track 136 may be lowered to the same level at block 140 as it is at block 138.

The mechanism involved in the actual transfer of one of the masses 114 or 116 may be more clearly explained by FIGS. 4–10. As an example, mass 116 may be employed, as depicted in phantom on FIG. 2, as the transferred mass. FIG. 4, showing the mechanism in the activated position, includes bar 112 having a plate 150 which fits into arcuate channel 152. Bar 112 affixes to plate 150. The combination is capable of holding weight 116 while revolving about hub 104. As depicted by FIG. 5, the pin, when elevated by the track 136, runs through partially V-shaped channel 154.

The mass 116 includes two equal portions 156 and 158, each portion respectively enclosed by caps 160 and 162, having a slidable relationship therebetween. Finger 130 of mass portion 158 slides within openings 164 and into slot 120 when the mass 116 transfers from arm 12 to arm 14. Spring means 166 urges mass member 158 away from slot 120 while the movement of pin 132 in channel 154 urges mass member 158 toward slot 120. Mass portion 156 also includes a finger, spring means, and opening arrangement (not shown) identical to mass portion 158 such as finger 130, spring means 166, and opening 164, for use with opening 122 (FIG. 2).

Pin 132 includes a slot 168 and a key 170 in arm 14 to prevent rotation of the pin 132 in the vertical plane during transfer of the mass 116. Mass 114 contains the same mechanism as mass 116 for the purposes of the transfer, from arm 12 to arm 14, and the masses be substituted freely to perform the transfer function to evenly distribute wear and tear and the like.

In operation, the device 10 has two counter rotating arms 12 and 14 that are synchronized to vertically align at two positions within their rotational cycles, where either mass 114 or 116 transfers to and from the first arm 12. As heretofore explained, mass 116 has been arbitrarily chosen, but proper calibration may employ mass 114 in the transfer mechanism herein described.

Power from a source drives driving shaft 30 which turns miter gear 36 and bevel gear 38. Arm 14 affixed to bushing 40 rotates in a plane substantially horizontal to the axis of driving shaft 30. Bevel gear 46 turns miter gear 48 which spins bevel gear 60. Arm 12 attached to flange 62, integral with bevel gear 60, rotates in a plane parallel to the plane of arm 14 and in an opposite direction to the path of rotation of arm 14 through gearing arrangements arms 12 and 14 vertically align at "transfer points I and II", shown on FIG. 1.

Miter gear 72 and bevel gear 76 rotate shaft 88 and turns masses 114 and 116 in a vertical plane as arm 12 rotates in a horizontal plane. At transfer point I, depicted in FIG. 2, the mass 116 fits between partitions 128 and 129, shown in phantom, of arm 14. At this point, the mass 116 the end of arm 14 has no relative motion therebetween. Just prior to that point, pin 132 enters channel 154 because of the rise in track 136 and spreads portions 156 and 158 apart. Fingers, shown by exemplar finger 130, enter openings 120 and 122, and bar 112 with affixed plate 150 rotates out of arcuate channel 152. Thus, mass 116 has been transferred to arm 14, FIGS. 4–6.

Arm 12 continues its rotation with only mass 114 for one hundred and eighty degrees to "transfer point II". It should be noted that hub 104 preferably dampens the oscillating motion produced by mass 114 on the arm 12 by being of a weight equal to the combined weight of masses 114 and 116. Likewise partitions 128 and 129 should be equal in weight to hub 104, such that the sum of the weight of masses 116 and partitions 128 and 129 equals the sum of the weight hub 104 and weight 114. Thus, the device 10 is balanced during the portion of the cycle of arm 12 between the "transfer points I and II".

With reference to FIG. 3, the stub 92 bears on spring 124 such that the oscillation force of mass 114 on arm 12 is dampened in one direction to help smooth the motion of arm 12 as it rotates.

When "transfer point II" is reached, the transfer mechanism reverses, FIGS. 7–10. Pin 132 lowers from channel 154 because of the position of track 134. Fingers, shown by exemplar 130 remove from openings 120 and 122. Plate 150 engages portions 158 and 160, FIG. 9, and mass 116 again rotates on bar 112 with mass 114.

The mechanical components of device 10 may be sealed in a vacuum with shaft 30 and handle structure 148 extending therethrough to reduce the effect of air friction on the rotating arms.

When arm 12 includes both masses 114 and 116, axle 16 receives a force along arm 12. This specifically occurs counterclockwise between "transfer point II" and "transfer point I". This linear force may be broken into two component forces, one in the direction of the arrow 172 and the other in a force horizontally disposed. The horizontal force, a deflecting force, is absorbed by the rigidity of rail track 18. Thus, device 10 moves along track 18 in the direction of the arrow 172. It should be noted that a plurality of pairs of arms identical to arms 12 and 14 may be placed on axle 16 to create a steady force in the direction of arrow 172. The device 10 alone will produce a pulse force during the time arm 12 travels from transfer point II to transfer point I. The transferring mechanism may be deactivated by pulling handle mechanism 148 and therefore the lower portion of bock 140. The sliding of the upper and lower portions of block 140 on surface 146, lower arm track 136 such that pin 132 does not enter channel 154 and transferring of mass 116 does not occur. Similarly, the raising of track 136 one hundred and eighty degrees from block 146 would reverse the transfer mechanism such that the device 10 would travel in a direction opposite to arrow 172. In other words, raising the track 136 to activate pin 132 opposite block 140 would brake device 10 moving in the direction of arrow 172 or cause device 10, at rest, to move in a direction opposite to arrow 172.

Device 10 may be used with an identical device to eliminate the need for rail track 18 and its equivalent. Applicant hereby incorporates, by reference, the specification of his U.S. Pat. No. 3,683,707, issued Aug. 15, 1972, wherein applicant describes the cancellation of horizontal forces. In particular, column 8, lines 9–38, describes the resolution of forces in the Y axis and cancellation of the forces in the X axis.

Figure 12:
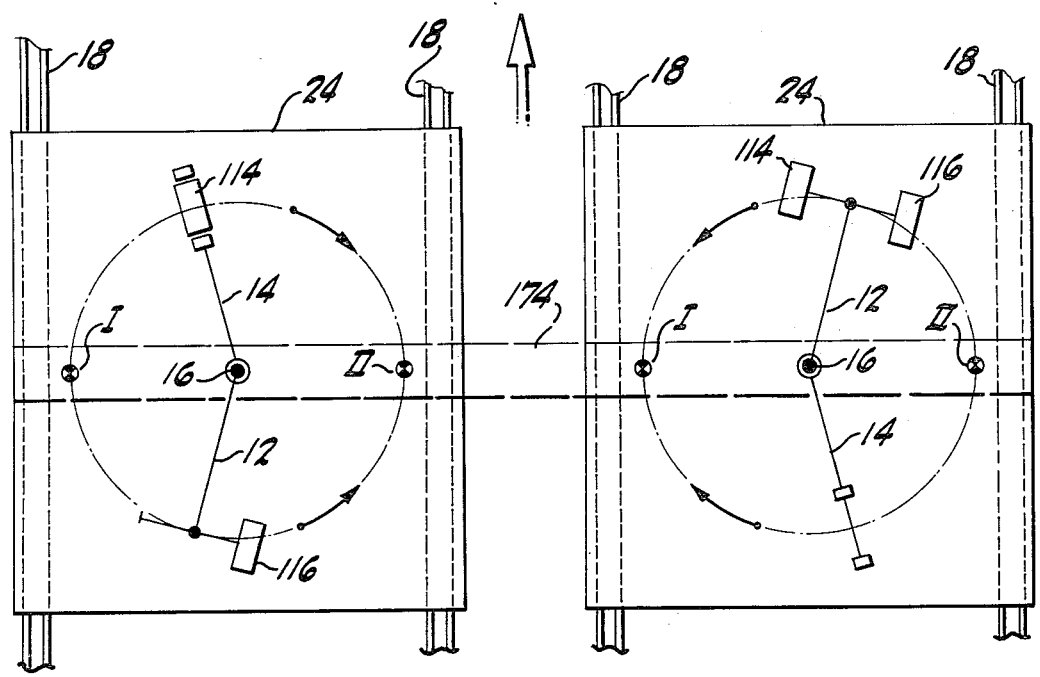
FIG. 12 is a schematic view showing a pair of devices in side-by-side connection, with the connecting leg in phantom.

By analogy, a set of devices identical to device 10 may be placed together, preferably side-by-side, with a leg 174 connecting identical axles 16 such that identical arms 12 are located at transfer point I on the first device and transfer point II on the second device FIGS. 11 and 12.

While in the foregoing specification embodiments of the invention have been set forth in considerable detail for purposes of making a complete disclosure of the invention, it will be apparent to those of ordinary skill in the art that numerous changes may be made in such details without departing from the spirit and principles of the invention.

What is claimed is:

1. Device for conversion of centrifugal force to linear force and motion comprising:
   a. first arm rotating in a circular path about an axis producing centrifugal force on the axis;
   b. a second arm rotating in a circular path about the axis of said first arm in a direction opposite to said first arm at a rotational speed equal to said first arm;
   c. mass positioned at the end of said first arm;
   d. means for transferring a portion of said mass from the end of said first arm to the end of said second arm and vice versa at two selected points in the rotational path of said arms spaced by one hundred eighty degrees, thus producing an imbalanced centrifugal force on the axis during one hundred eighty degrees of the circular path of said first arm;
   e. means for canceling a component of the imbalanced centrifugal force.

2. The device of claim 1 in which said mass positioned at the end of said first arm comprises a first mass and a second equivalent mass each mass located respectively on a first and second bar equidistant from the end of said first arm, at least one of said masses detachably connected to the corresponding bar for transfer to said second arm, said masses rotating in a plane substantially perpendicular to the planes of rotation of said first and second arms.

3. The device of claim 2 in which said second arm includes a pair of partitions having a pair of opposed slots, said transferable mass having a pair of moveable fingers insertabe in said pair of slots during transfer of said mass from said first arm to said second arm and said fingers retractalbe during transfer of said mass from said first arm to said second arm.

4. The device of claim 3 in which said second arm includes a cam operated pin, a portion of which is insertable in a channel within said transferable mass, said insertion of said pin causing insertion of said pair of moveable fingers in said pair of opposed slots and detachment of said bar from said transferable mass and retraction of said pin from said channel causes retraction of said fingers and attachment of said bar.

5. The device of claim 4 in which said cam operated pin includes a cam follower at the end opposite the insertable portion of said pin and a cam track, said cam folloer engaging the surface of said cam track, said cam track causing said pin to insert in and retract from said channel.

6. The device of claim 1 in which the transfer of a portion of said mass takes place where there is no relative motion between said mass portion and said second arm.

7. The device of claim 6 in which said mass positioned at the end of said first arm comprises a first mass and a second equivalent mass, each mass located respectively on a first and second bar equidistant from the end of said first arm, at least one of said masses detachably connected to the corresponding bar for transfer to said second arm, said masses rotating in a plane substantially perpendicular to the planes of rotation of said first and second arms.

8. The device of claim 7 in which said second arm includes a pair of partitions having a pair of opposed slots, said transferable mass having a pair of moveable fingers insertable in said pair of slots during transfer of said mass from said first arm to said second arm and said finers retractable during transfer of said mass from said first arm to said second arm.

9. The device of claim 8 in which said second arm includes a cam operated pin, a portion of which is insertable in a channel within said transferable mass, said insertion of said pin causing insertion of said pair of moveable fingers in said pair of opposed slots and detachment of said bar from said transferable mass and retraction of said pin from said channel causes retraction of said fingers and attachment of said bar.

10. The device of claim 9 in which said cam operated pin includes a cam follower at the end opposite the insertable portion of said pin and a cam track, said cam follower engaging the surface of said cam track, said cam track causing said pin to insert in and retract from said channel.

11. A device for conversion of centrifugal force to linear force and motion comprising a pair of apparatuses, each having:
 a. first arm rotating in a circular path about an axis producing centrifugal force on the axis;
 b. a second arm rotating in a circular path about the axis of said first arm in a direction opposite to said first arm at a rotational speed equal to said first arm;
 c. mass positioned at the end of said first arm;
 d. means for transferring a portion of said mass from the end of said first arm to the end of said second arm and vice versa at two selected points in the rotational path of said arms spaced by one hundred eighty degrees, thus producing an imbalanced centrifugal force on the axis during one hundred eighty degrees of the circular path of said first arm;
 e. and a connecting leg rigidly attached to the axes of rotation of each of said apparatuses, the linear direction of movement of said device being in a direction perpendicular to axis of said leg.

* * * * *